Sept. 15, 1936.  M. J. DE MASK  2,054,193
SWITCH MECHANISM FOR MULTIPLE OUTLET CONDUITS
Original Filed May 9, 1932  3 Sheets-Sheet 3
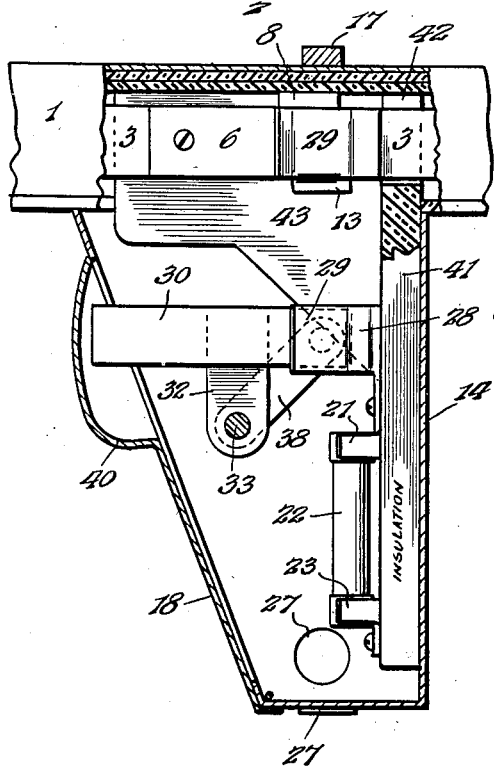
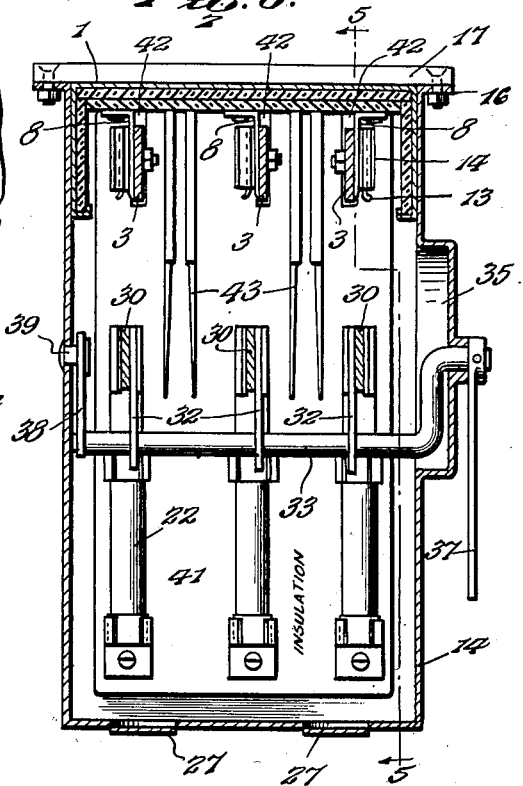
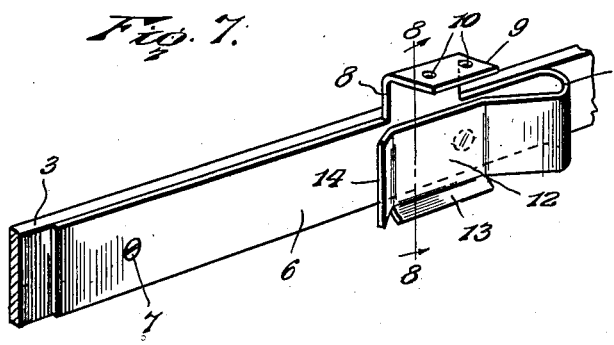
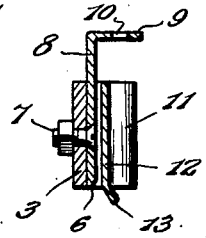
Inventor
M. J. De Mask.
By Lacey & Lacey, Attorneys Patented Sept. 15, 1936

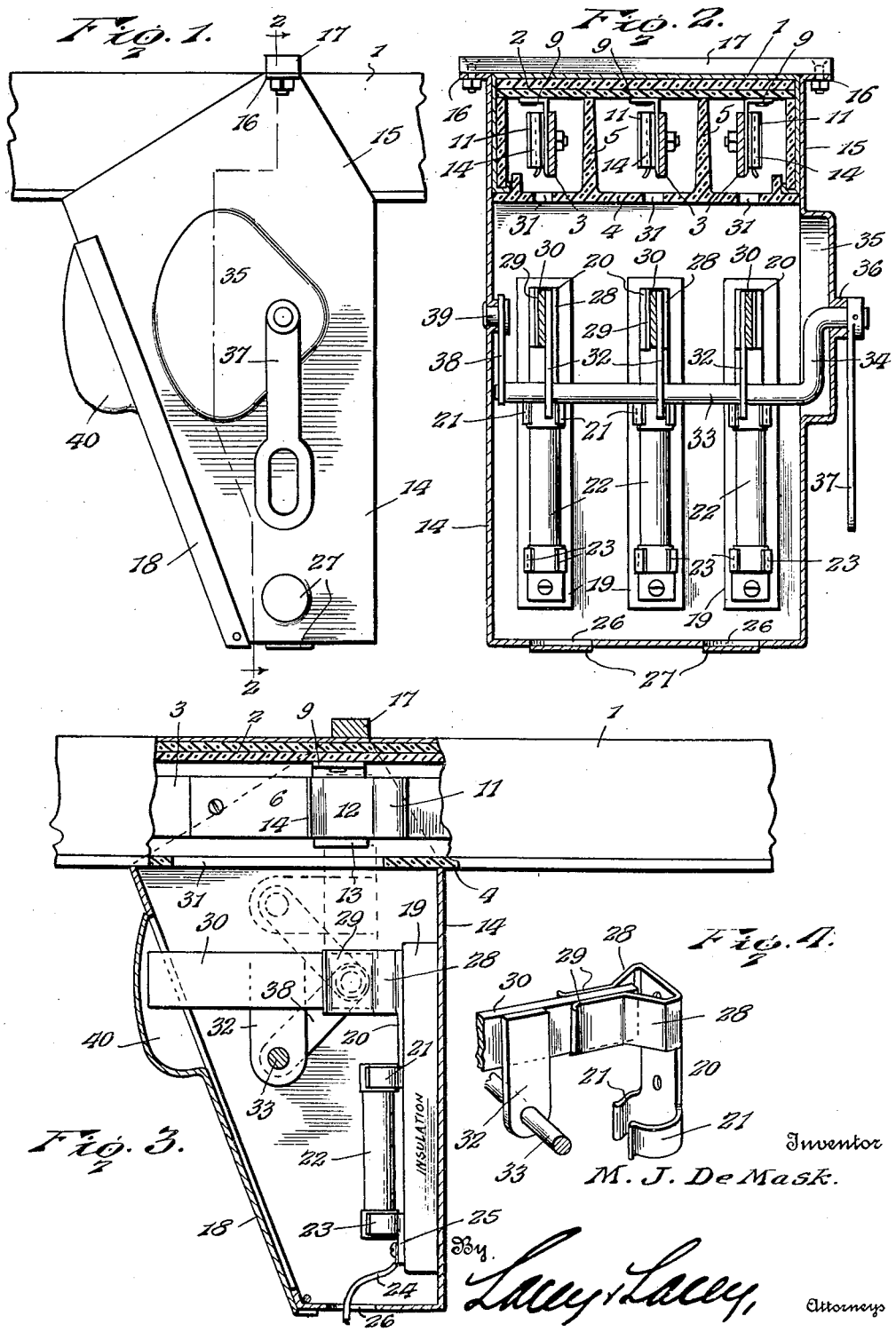

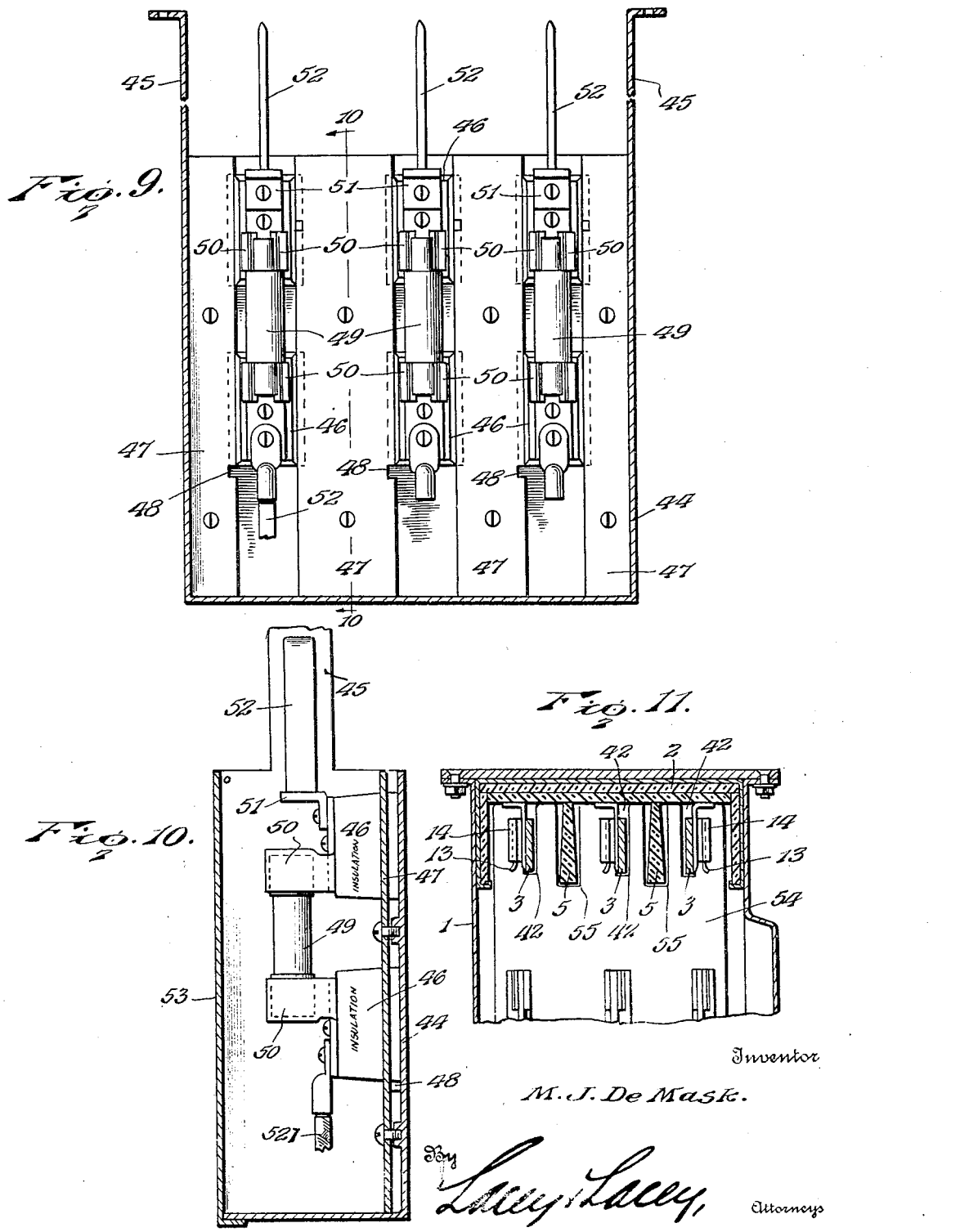

2,054,193

UNITED STATES PATENT OFFICE 2,054,193

SWITCH MECHANISM FOR MULTIPLE OUTLET CONDUITS

Martin J. De Mask, Pittsfield, Mass.

Application May 9, 1932, Serial No. 610,298
Renewed January 2, 1935

14 Claims. (Cl. 247—3)

This invention relates to multiple conduits for electrical conductors of that type in which a plurality of bus bars are mounted within a conduit to convey current and the conduit is provided with openings at intervals through which connections may be made to carry current through branches to energize lamps or activate working tools, and the present invention has for its object to provide a switch mechanism especially adapted for use in connection with such a conduit and which may be readily attached to the conduit in such position that the switch blades may be swung into and out of the conduit to engage or release the bus bars so as to establish or break the branch circuits. Another object of the present invention is to provide an improved contact clip which will be engaged by the switch blades and which will avoid direct contact between the bus bars and the switch blades so that the arcing which occurs when the blades are withdrawn will not damage the bus bars. Another object of the invention is to provide an improved plug especially adapted for insertion into a coupling conduit to take off current therefrom. The stated objects, and other objects which will appear incidentally in the course of the following description, are attained in such devices as are illustrated in the accompanying drawings, and the invention resides in certain novel features which will be particularly defined in the appended claims.

In the drawings, Fig. 1 is a side elevation of a multiple outlet conduit and a switch box applied thereto, Fig. 2 is a transverse section on the line 2—2 of Fig. 1, Fig. 3 is a view, partly in side elevation and partly in vertical section, of the switch, Fig. 4 is a detail perspective view showing the bracket or clip within the switch box which is engaged by the inner end of a switch blade, Fig. 5 is a view similar to Fig. 3 but showing a modification of the supporting base upon which the switch blades are mounted, Fig. 6 is a view similar to Fig. 2 but showing the structure illustrated in Fig. 5, the line 5—5 in Fig. 6 indicating the plane of the section shown in Fig. 5, Fig. 7 is a detail perspective view of one of the contact clips which is secured upon the bus bar and provides means for supporting the bus bar, Fig. 8 is a detail section on the line 8—8 of Fig. 7, Fig. 9 is a view, partly in front elevation and partly in section, of a plug which is particularly adapted for use in connection with the conduit, Fig. 10 is a section on the line 10—10 of Fig. 9.

Fig. 11 is a transverse section showing a further modification of the switch base or supporting block.

The conduit, indicated as an entirety by the reference numeral 1, comprises a metallic casing or shell which is furnished in sections adapted to be alined and secured to the wall of a room or other fixed support, the sections being provided in such lengths as may be conveniently handled. Each shell is provided with a lining of insulation, as shown at 2, and within the shell are provided longitudinal bus bars 3 for conducting current through the conduit. In the form of conduit shown in Figs. 1, 2 and 3, a cover 4 of insulation is provided and this cover is formed with barriers 5 extending longitudinally thereof and preferably integral therewith so that, when the cover is brought into position, each barrier will be between and parallel with two bus bars and, consequently, jumping of the current or arcing from one bus bar to an adjacent bar will be prevented. At intervals in the lengths of the bus bars, contact clips are secured thereto and these clips are preferably of the form shown in detail in Figs. 7 and 8. Each clip consists of a flat strip 6 of metal which is secured against the side of the bus bar by bolts 7 countersunk in the strips, as shown clearly in Fig. 8. Adjacent one end, the strip 6 has an extension 8 rising from its upper edge and the upper end of this extension is turned laterally, as shown at 9, and has openings 10 formed therethrough through which fastening devices may be inserted into the top or back of the conduit to secure the clips in place and thereby support the bus bar in its proper position. Adjacent the extension 8 the end of the strip or plate 6 is doubled on itself, as shown at 11, and provides a jaw or resilient tongue 12 normally lying close to and parallel with the side of the strip 6 so that, if a switch blade or plug contact be inserted between the base strip 6 and the tongue, a good electrical connection will be made. To facilitate the entrance of the blade into the clip, the lower edge of the tongue 12 is beveled or provided with an outwardly inclined lip 13, and the end of the tongue is likewise provided with an outwardly turned lip 14 so that the blade will be easily guided into its proper position to form electrical contact with the clip. It will be readily noted that the base strip 6 of the clip is elongated relative to the tongue 12 so that when a switch blade swings out of engagement with the clip the arc which may be possibly formed will not reach the bus bar to burn or otherwise damage the latter. As shown most clearly in Fig. 8, the lower edge of the base strip 6 is beveled to facilitate the entrance of the blade into the clip.

The clips shown in Figs. 7 and 8, which have been particularly described, are provided at proper intervals, two or more feet, in the lengths of the bus bars so that the bus bars will be firmly supported, and, at intervals between these supporting clips, other clips are secured upon the bus bars which are identical with the described clips except that the extensions 8 are omitted, these clips serving only as contact clips and not as supports for the bus bars. The cover, of course, is provided with openings at intervals alined with the respective clips so that branch conductors may be inserted through the cover into engagement with the clips to establish the branch circuits.

In Figs. 1 to 6 are illustrated switch devices which are mounted upon the conduit and constitute safety means for establishing or breaking branch circuits at will. A metallic casing 14 of suitable form is provided and has its side members extended upwardly, as shown at 15, whereby they are adapted to pass alongside the side walls of the conduit, and the upper extremity of these extensions are turned outwardly, as shown at 16, to bear against the underside of a bar 17, at the projecting ends of said bar, to be secured thereto so that the casing will be supported on the conduit. This casing is provided with a swinging door 18 whereby access may be had to the interior of the casing, when desired, and upon the inner surface of the back wall of the casing, as shown in Figs. 2 and 3, are provided a plurality of blocks 19 of porcelain or other insulating material and upon each block is secured a bracket or clip 20 which is shown more in detail in Fig. 4. This clip or bracket comprises a back plate of metal through which fastening devices are inserted to secure the clip upon the block of insulation and, at its lower end, spring fingers 21 extend from the back plate and are of arcuate formation to engage around and hold a fuse 22, the lower end of the fuse being engaged and held by similar fingers 23 secured upon the base block 19 at the lower end of the block, and a conductor 24 being secured to the tongue 25 depending from said fingers 23 and passing out through an opening 26 in the lower end of the shell or casing 14, as shown clearly in Fig. 3. The shell or casing is constructed with knock-outs 27 of well-known form which are removed to uncover the respective openings 26 when conductors are to be carried therethrough. At the upper end of the bracket 20, converging tongues 28 extend therefrom and these tongues merge into flat parallel jaws 29 between which is received an end of a switch blade 30. A plurality of the switch blades 30 is provided and each blade is alined vertically with a contact clip on a bus bar in the conduit so that if the blade be moved through a slot 31 provided in the cover 4 it will be guided directly into engagement with a contact clip and the circuit through the lateral conductors will be closed. The blades of the switch will be held firmly at their inner ends by and between the spring jaws 29 so that they may move pivotally without being positively secured to the jaws, and in all positions of the blades the electrical contact between the jaws and the blades will be maintained. The several blades 30 are formed with, or have secured thereto, arms 32 which extend therefrom and, in the open position of the blades shown in Figs. 2 and 3, depend therefrom. Through the ends of the arms 32 is engaged a shaft 33 having a crank 34 formed at one end and disposed within an offset 35 of the shell 14, said crank being journaled in a boss 36 formed on said offset and having a handle 37 secured thereto outside of the shell, as shown in Figs. 1 and 2. At the opposite end of the shaft 33 is attached a link 38 which is equal in length to the crank 34 and has one end provided with a stud 39 which is journaled in the adjacent side of the shell 14 in axial alinement with the end of the crank 34 and with the jaws 29, as shown in Figs. 2 and 3. It will now be readily understood that if the handle or lever 37 be swung upwardly, the shaft 33 will be rocked about its pivotal supports and the arms 32 will be swung about the centers of the several jaws 29 so that the blades 30 will be carried from the horizontal position shown in full lines in Fig. 3 to the vertical position shown by dotted lines in Fig. 3 to engage the contact clips and close the circuits. The door 18 is provided with an offset portion 40 to accommodate the movement of the ends of the blades 30, as will be understood upon reference to Fig. 3.

In Figs. 5 and 6, I have shown a modification of the switch device in which the same shell or casing 14 is employed but instead of the separate base blocks 19 a single base 41 of porcelain, slate or other insulation is provided and this block is constructed in its upper edge with notches 42 adapted to engage and fit around the respective bus bars when the switch casing is brought into its proper relation to the conduit. The fuses 22 are mounted upon the block 41 in the same manner as the fuses in the first-described form and are so placed that the switch blades cooperating therewith will be alined with the contact clips on the respective bus bars when the parts are assembled, the notches 42 guiding the base plate into proper position as they slide into engagement with the bus bars. On the front or inner side of the base block 41 are formed partitions 43 which pass up into the conduit and assume positions between adjacent bus bars so that they serve as barriers to prevent the passage of electric current between the adjacent parallel bars, the barriers in the conduit being cut away in the area covered by the switch casing and the projections or partitions 43 alining with the sections of the barriers. The contact clips and the switch blades in this form of the invention are identical with those in the first-described form. It will be noticed, however, upon reference to Fig. 6, that the cover 4 is omitted or cut away through such a length of the conduit as will accommodate the switch casing, the projecting partitions or plates 43 assuming the functions of the barriers on the cover so that, through the area of the switch casing, the cover is unnecessary.

In Figs. 9 and 10, I have illustrated a plug which is especially adapted for use in connection with the multiple outlet conduit which has been heretofore briefly described and is shown in Figs. 1, 2, 3, 5 and 6. This plug comprises a metallic shell 44 having an open upper end and provided at its upper end with extensions 45 adapted to pass up at the sides of the conduit and be secured to the ends of a cross bar, as 17, to suspend the shell or casing on the conduit. Within the shell, I provide a plurality of base blocks 46 of porcelain or other insulating material which blocks are arranged in pairs with the members of each pair in vertical alinement. Each block is provided with flanges on its sides adapted to engage under parting strips 47 which are secured within the shell so that if the blocks be moved downwardly with their flanges behind the parting strips the blocks will be firmly engaged and held between the strips and the back of the shell or casing. Tongues 48 are struck from some of the parting strips to bear against the back of the shell and form stops to limit the downward movement of the blocks 46. These base blocks 46 are held in proper alinement and in spaced relation by fuses 49 which are carried thereby, as clearly shown, the ends of the fuses being engaged and held by clips 50 secured upon the respective base blocks, as shown and as will be understood. To the upper blocks 46 are secured brackets 51 which are in electrical and mechanical engagement with the upper clips 50, and from the respective brackets 51 project blades 52 which extend through and beyond the top of the shell 44 and are spaced apart properly to engage contact clips on the bus bars when the blades are inserted through the openings provided therefor in the cover of the conduit. Conductors 521 are attached to the lower clips 50 and extend out through openings provided therefor in the bottom of the shell or casing 44 to carry the current to the point of use, as will be understood. When the plug is to be inserted in a conduit, it is merely brought into position with its blades 52 alined with the openings in the cover or outer side of the conduit and then pushed toward the conduit until the extensions 45 meet the cross bar on the top of the conduit whereupon the blades 52 will be engaged with the contact clips on the respective bus bars, the ends of the extension, of course, being secured to the ends of the cross bar. The plug being provided with fuses, an overload of current cannot pass out through the branch circuit to burn out a lamp or tool inasmuch as the fuse on the line receiving the overload will be at once blown and the line consequently put out of commission until a new fuse is inserted. This same advantage applies to the switch. The casing 44 is provided with a hinged door 53 to facilitate replacement of a blown fuse. The structure is inexpensive and is highly efficient for use in connection with high voltages.

In Fig. 11 is shown a form of the switch in which the base block 54 of insulation has its upper end extended into the conduit, as in Figs. 5 and 6, and is provided with notches 42 to engage the bus bars but the partitions 43 are omitted. While a portion of the cover 4 is removed, the barriers 5 are retained and notches 55 are provided in the upper edge of the base block to fit around the barriers.

It will be understood, of course, that the switch casing or shell may be lined with insulation and that bushings of insulation may be provided around the shaft 33 in order to avoid possible short circuits and consequent injury to operators.

Having thus described the invention, I claim:—

1. Apparatus for the purpose set forth comprising a conduit, bus bars within the conduit, a casing attached to the conduit, a support of insulation within the casing, clips on the support, switch blades engaged at one end in the respective clips, and means for rocking the blades whereby to cause them to enter the conduit and make electrical connection with the bus bars therein.

2. In apparatus for the purpose set forth, a conduit having an opening in one side, a switch casing attached to the conduit over said opening, a support of insulation within said casing adapted to extend into the conduit through the opening therein, partitions on said support projecting therefrom to enter the conduit and being disposed between bus bars therein, clips on the support, electrical conductors connected with said clips and extending from the switch casing, switch blades held at one end in the clips, and means for rocking the blades whereby to cause them to enter the conduit and electrically engage the bus bars.

3. Apparatus of the type described comprising a conduit, bus bars extending longitudinally of the conduit, a block of insulation insertable endwise through the bottom of the conduit and provided in its upper edge with notches to engage the bus bars, means for supporting the block on the conduit, projections on the upper portion of the block extending parallel with the bus bars, blades mounted on the block to electrically engage the bus bars, and electrical conductors connected with the blades.

4. Apparatus of the type described comprising a conduit, bus bars extending longitudinally of the conduit, barriers of insulation between and parallel with the bus bars, a block of insulation insertable endwise through the bottom of the conduit and provided in its upper edge with notches to engage the bus bars and the barriers, means for supporting the block on the conduit, blades mounted on the block to electrically engage the bus bars, and electrical conductors connected with the blades.

5. In apparatus of the type described, a conduit, bus bars within the conduit, clips electrically connected to the bus bars, a switch casing engageable with the conduit, clips mounted within the switch casing and insulated therefrom, substantially straight switch blades engaged at one end in the insulated clips and held thereby, arms secured to the blades between the ends thereof and extending at substantially a right angle thereto, a shaft having a crank engaged through the ends of the arms and having its ends journaled in the sides of the casing in alinement with the blade-engaging ends of the insulated clips, a handle for rocking said crank to lift the arms through an arc to dispose the free ends of the blades in engagement with the bus bar clips, and electrical conductors extending from the insulated clips through the switch casing.

6. Apparatus for the purpose set forth comprising a conduit, bus bars within the conduit, a casing attached to the conduit, a support of insulation within the casing, switch blades within the casing and carried by said support, and means for moving the switch blades as a unit to cause them to enter the conduit and to make electrical connection with the bus bars therein.

7. Apparatus for the purpose set forth comprising a conduit, conductors within the conduit, an insulating support detachably connected to the conduit, contact elements mounted on the insulating support out of electrical contact with each other, and means for moving at least one of the contact elements between a position electrically contacting a conductor within the conduit and a position out of electrical contact with such conductor and substantially outside of the conduit.

8. Apparatus of the type described comprising a conduit, bus bars extending longitudinally of the conduit, a casing detachably connected to a side of the conduit over an opening therein, contact blades mounted within the casing and adapted to electrically engage the bus bars, the said casing having an opening in the side adjacent the conduit substantially aligned with the opening in the conduit, both openings being of sufficient extent to permit inspection or repair of the contents of the conduit, through the casing, without disturbing the electrical conductors within the casing, and an opening in another side of the casing giving manual access to the casing.

9. Apparatus of the type described comprising an elongated support, an extended bus bar mounted on said support, an insulating block mounted on said elongated support, contact means mounted on said insulating block and adapted to electrically engage said bus bar, said insulating block being provided in one edge with a notch in which said bus bar is received when said insulating block is in co-operative relationship with the said bus bar whereby said bus bar is properly aligned with said contact means when said bus bar is entered in said notch.

10. Means for making connection with bus bars housed in a conduit, said means comprising a casing adapted to be adjustably positioned on said conduit and containing an insulating block having notches for receiving said bus bars and adapted to extend into said conduit, movable conducting elements mounted on the insulating block in said housing for making electrical connections with said bus bars, and insulating members mounted on said insulating block and disposed between said bus bars when in operative position for preventing arcing therebetween.

11. Apparatus for the purpose set forth comprising a conduit, bus bars extending within the conduit, an insulating body provided with spaced partitions adapted to be inserted through a side of the conduit and disposed between adjacent bus bars, and contact blades mounted on the insulating body to electrically engage the bus bars when the insulating body is moved into cooperative relationship with the bus bars, the said contact blades engaging the bus bars at a point between the said partitions so that arcing is prevented between adjacent bus bars.

12. Apparatus for the purpose set forth comprising a conduit, bus bars extending longitudinally within the conduit, an insulating body positioned on the conduit to one side of the bus bars and provided with an insulating member interposed between a side of a bus bar and a side of the conduit, and contact blades mounted on the insulating body to electrically engage said bus bars.

13. In apparatus of the class described, a conduit, a first conductor comprising an extended bus bar within the conduit, a second conductor, an insulating support adapted to be adjustably positioned on said conduit, and conducting means mounted on said insulating support, there being at least a portion of said conducting means movable in a predetermined path to electrically connect, or disconnect, said first and said second conductors while the said insulating support is positioned on the said conduit.

14. In apparatus of the class described, a conduit, bus bars within the conduit, an insulating support adjustably positioned on the conduit, automatic circuit interrupting means mounted on the insulating support, and contact blades also mounted on the insulating support and adapted to be withdrawn from electrical contact with the bus bars while the insulating support is positioned on the conduit, thereby electrically disconnecting the said automatic circuit interrupting means so that the said circuit interrupting means may be safely serviced or replaced without removing the said insulating support from the conduit.

MARTIN J. DE MASK.